United States Patent [19]

Poole

[11] 4,387,703

[45] Jun. 14, 1983

[54] SOLAR HEATING DEVICE

[76] Inventor: Lee H. Poole, 34 North St., Washingtonville, N.Y. 10992

[21] Appl. No.: 263,201

[22] Filed: May 13, 1981

[51] Int. Cl.$^3$ .............................................. F24J 3/02
[52] U.S. Cl. .................................. 126/429; 126/444; 126/449
[58] Field of Search ................ 126/429, 449, 444, 432

[56] References Cited

U.S. PATENT DOCUMENTS 4,207,867  6/1980  Hanks .................................. 126/449
4,257,396  3/1981  Reinert ............................... 126/429

Primary Examiner—Carroll B. Dority, Jr.
Attorney, Agent, or Firm—Cushman, Darby & Cushman

[57] ABSTRACT

A multilayer solar collector structure wherein internal ducting to properly channel fluid flow of the collection medium is integrally provided within the internal layer design. First, second and third insulation layers are included with the first and third serving to sandwich the second therebetween. The second layer is shaped so that it defines an inner hollow core area between the first and third layers so that air from the building is drawn through an inlet which is in communication with that hollow inner core area. A blackened wire mesh adsorber is provided between the top of the third or uppermost layer and a transparent cover and that third layer includes an opening at one end in communication with the hollow core area thereunder and another opening at the opposite end in communication with an exit or exhaust opening. Thus, air can flow from the building into the collector, through the hollow core, the adsorber mesh and returned to the building.

3 Claims, 4 Drawing Figures

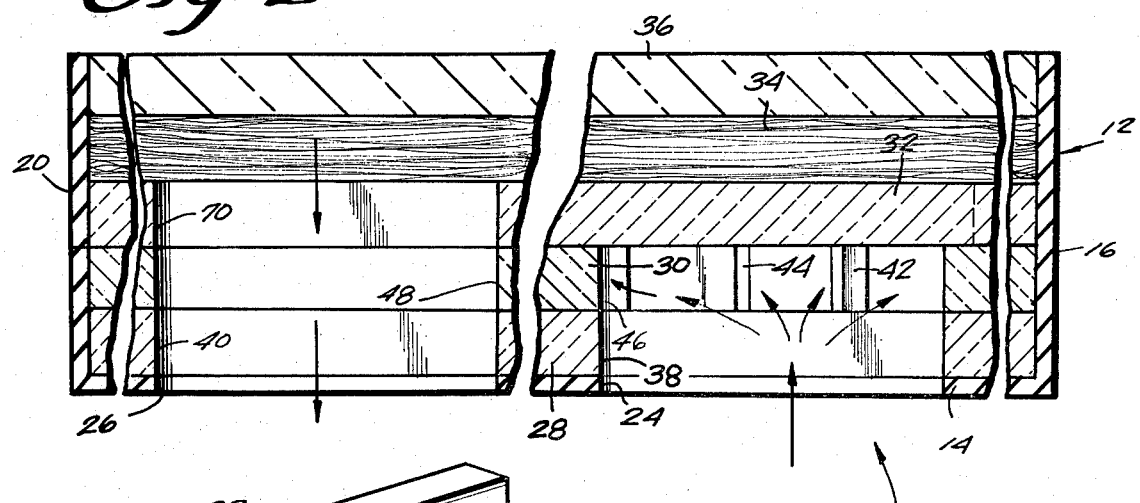
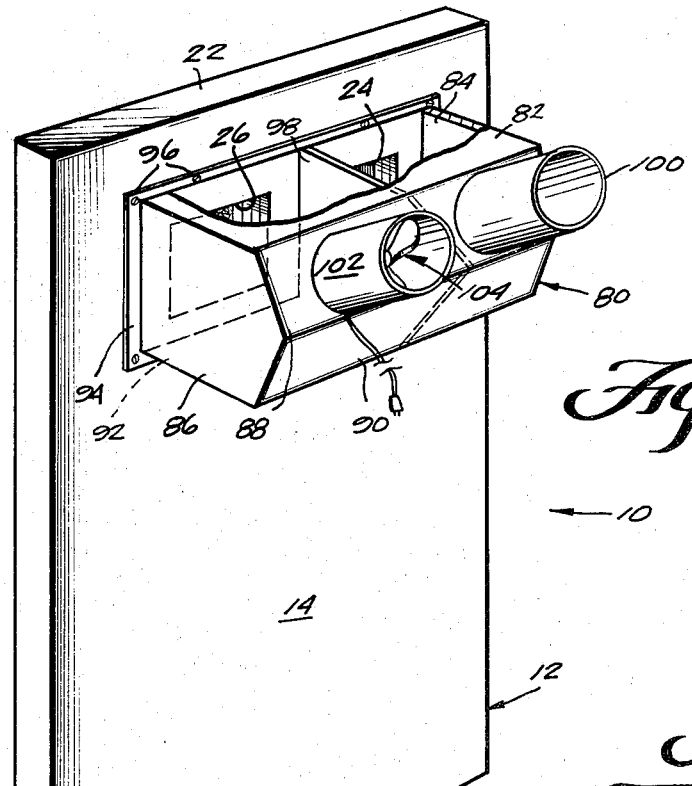
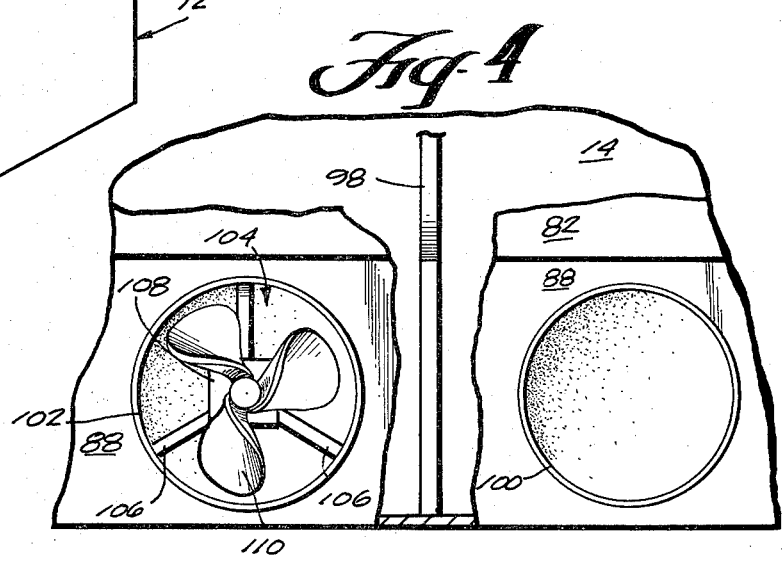

SOLAR HEATING DEVICE

FIELD OF THE INVENTION

This invention relates to solar collectors in general and specifically to a design and construction where solar energy can be most efficiently and effectively used to heat air for directly heating buildings or rooms therein. In particular, the present invention relates to an improved collector structure that provides a simple, yet effective way for inexpensively constructing a solar collector while simultaneously raising the efficiency of the heat collection and providing an efficient path for directing air flow from within a building through the collector structure and back to the room or rooms being heated.

BACKGROUND OF THE PRESENT INVENTION

Heating air by flat plate collectors is widely known as are the advantages for such collectors. The present invention relates to a solar collector which will heat air for use directly within the building being heated unlike other collector devices that are used in systems where the medium passing through the collector is used in a heat exchanger to in turn heat another fluid, the latter which is used to heat the atmosphere within a building.

A wide variety of collector types are known, and of those, a number employ a type of fiber or filament adsorber that is blackened in order to aid in the collection of solar energy. Exemplary of such devices are Brinn et al., U.S. Pat. No. 4,067,316; Ashman et al., U.S. Pat. No. 3,220,671 and Heyen et al., U.S. Pat. No. 4,119,083. The types of fibers used include mineral or glass wool, blackened fiber glass or blackened lathe turnings or wool-like material or a blackened gauze material.

Other collector structures are known which employ a channel structure in a top layer directly beneath a transparent foil or film in which water can flow, as in Sarazin et al., U.S. Pat. No. 3,996,092, while others employ a plurality of stacked hollow areas through which air can sinuously move, sometimes about baffle structures as in Yu, U.S. Pat. No. 4,154,222, and Skrivseth, U.S. Pat. No. 4,099,513. The baffles are provided to produce a more turbulent flow, usually about both sides of a blackened absorber plate so as to increase the heat exchange relationship of the air passing through the collector about that plate.

Collectors are also known where insulation is used about the side and rear walls as in Schriefer, Jr., U.S. Pat. No. Re. 30,136 and Weinstein, U.S. Pat. No. 4,141,339, and other patents which are of general interest include: Lof, U.S. Pat. No. 4,072,142; Lewis, Sr., U.S. Pat. No. 4,156,419; Erb, U.S. Pat. No. 4,178,914 and Burgen, U.S. Pat. No. 4,219,012.

SUMMARY OF THE PRESENT INVENTION

The present invention is comprised of a multi-layer structure with the primary internal layers each being comprised of sheets of foam insulation. The outer housing includes, adjacent one end, an entrance and an exit opening about which a window mounting device is positioned on the exterior of that housing. The mounting device includes an entrance and exit chamber which, respectively, communicate directly with the entrance and exit openings and provide access for the air in the dwelling or building to flow to and from the collector structure.

Located on the interior and directly against the collector's main bottom surface is a first insulating layer which also includes two openings aligned with the air entrance and exit openings in the outer housing. A second insulating layer is mounted on the first one and it also includes two openings which are aligned with the air entrance and exit openings in the first insulating layer and the outer housing so that air can enter and exit therethrough. In both these first and second insulation layers, the exit opening does not have any line of direct communication with entrance opening so that air passing through the entrance opening in that layer will not flow into or be mixed with air flowing through the exit opening and vice versa. The entrance opening in the first layer is likewise bounded by the layer structure about its periphery. The entrance opening in the second layer, on the other hand, is extended and runs toward the other end of the layer from which the entrance and exit openings originate so as to occupy a majority of the length and width of that second layer while maintaining a closed path with respect to the area where the exit opening is provided.

A third layer of insulating material is placed over the second producing a three-layer sandwiched structure. This third layer includes a single exit opening in alignment with the exit openings in the first and second layers and in outer housing. At the opposite end, the third layer includes a single slot like opening aligned with and above the extended portion of the inlet opening in the second insulating layer. Thus, air flowing in through the mounting device and into the inlet opening of the outer housing will pass through the inlet openings in the first and second layers and thence downwardly along and through the cavity provided between the first and third layers the size and sides of which are defined by the cut out area in the second layer which extends away from the entrance opening. The air will finally pass upwardly through the slot opening provided adjacent the bottom edge of the third insulating layer at the end opposite where the exit opening is located and into the area above the third layer.

Located above the third insulating layer is a particular arrangement of blackened wire mesh and the entire assembly is sealed within the outer housing by at least one transparent layer comprised of a glass or plastic sheet. Thus, the air flowing through the slot in the third layer will flow toward the exit opening at the opposite end and will flow through the blackened wire collecting heat. The heated air will then flow out of the collector and pass directly into the dwelling. By employing the flow in the third layer, air will pass uniformly through the wire mesh.

When the completed device is to be used, the mounting structure is positioned so that the body thereof will fit into a window and after being suitably sealed, the circulation means in the form of a fan located in the exit side will be actuated.

Other objects, features, and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 2 is a cross-section of the collector shown in FIG. 1 taken through the entrance and exit openings;

FIG. 3 is a rear perspective showing the collector housing and the window mounting means; and FIG. 4 is a enlarged, detailed view of a portion of the mounting structure.

DETAILED DESCRIPTION OF THE PREFERRED, EXEMPLARY EMBODIMENT

Figure 1:
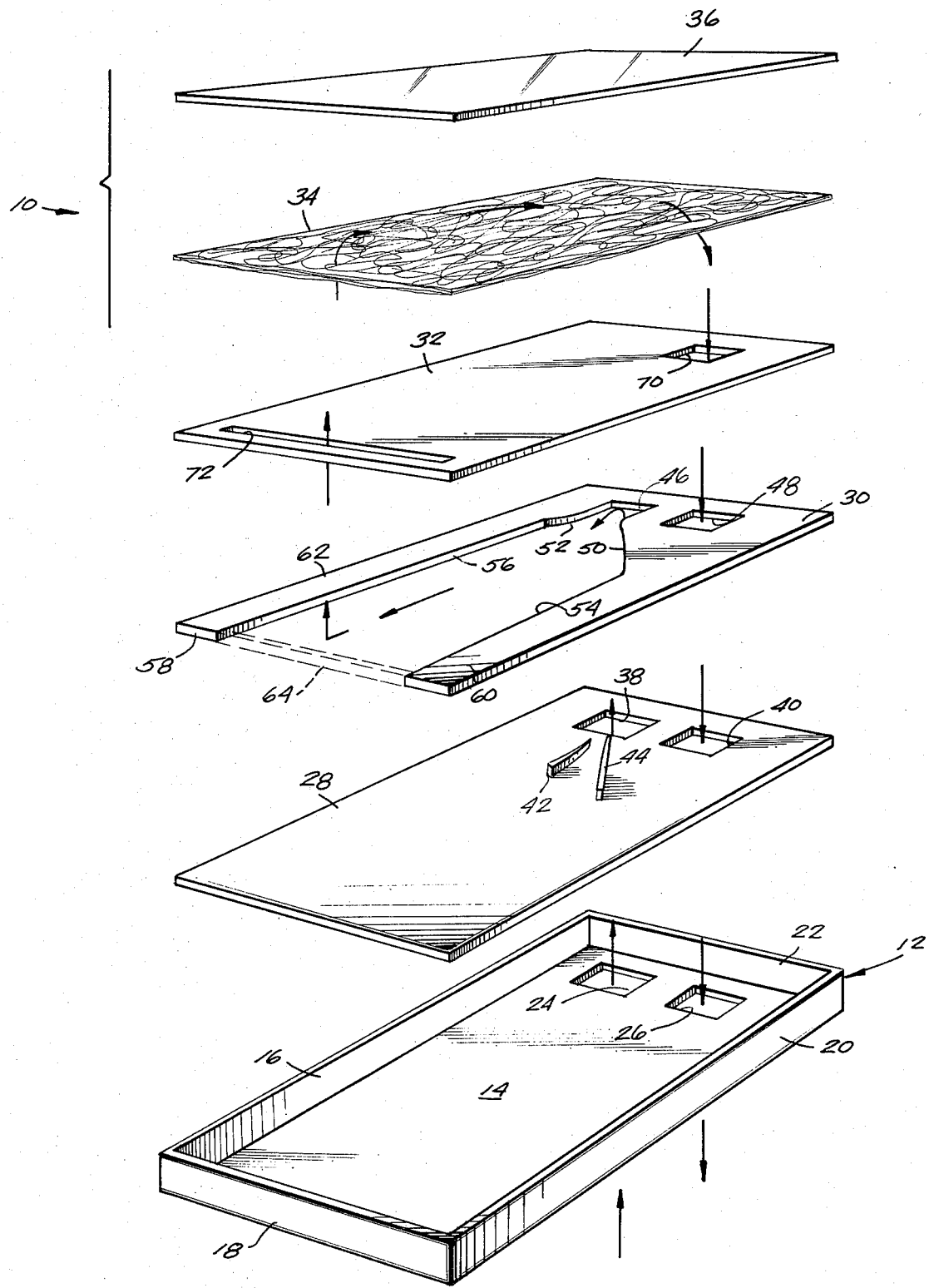
FIG. 1 is an exploded perspective view of the present invention showing each of the internal layers and its structure.

Turning first to FIG. 1, the present invention is generally indicated at 10 and is comprised of an outer housing, generally indicated at 12, which includes a bottom wall 14 and side walls 16, 18, 20 and 22.

Located within outer housing 12 at one end, which can be referred to as the top end, are entrance and exit openings, respectively, indicated at 24 and 26.

Three foam insulating layers 28, 30 and 32 are positioned within outer housing 12 in a stacked configuration. These insulation layers are preferably covered with a foil although that is not required. Layer 28 will be referred to hereinafter as the first insulating layer and is in contact with bottom wall 14 of the outer housing. Layer 30 is the second insulating layer and is positioned on top of layer 28. Layer 32 is the third insulating layer and is positioned on top of second insulating layer 30. Located above layer 32 is a layer of blackened wire mesh 34 and when each of those layers is placed within the outer housing 12, as shown in FIG. 2, the housing will be closed by top transparent sheet or panel 36, formed from either tempered glass or plastic. Sheet 36 can be suitably sealed to the top peripheral portions of the side walls of outer housing 12 by any convenient means including adhesives or by a mounting frame (not shown) and a sealant.

As shown in FIG. 2, when each of these layers is placed within outer housing 12, the bottom surface of insulating layer 28 will be in contact with the interior surface of bottom wall 14; the bottom of second layer 30, will be in contact with the upper surface of layer 28; the bottom surface of third layer 32 will be in contact with the top surface of second layer 30; and the wire mesh will be in contact and rest upon the upper surface of third layer 32.

The first insulation layer 28 includes spaced apart entrance and exit opening 38 and 40, respectively, and air flow deflectors or baffles 42 and 44, positioned adjacent entrance opening 38 for deflecting air in a particular manner as will become more evident hereafter.

The second foam insulating layer 30 includes entrance and exit openings 46 and 48, respectively, with exit opening 48 being in alignment with exit openings 26 and 40 and is not in direct communication with inlet opening 46. The entrance or inlet opening 46, however, opens out into a larger area bounded initially by tapering edges 50 and 52 and thereafter by substantially straight edges 54 and 56. Edges 54 and 56 can terminate at the opposite end from where opening 46 is located, indicated at 58 in FIG. 1 so that the opening bounded by edges 50, 52, 54 and 56 will pass straight out of the end of layer 30 thereby defining legs 60 and 62. Alternatively, a cross piece 64 can be left between legs 60 and 62 so that cross piece 64 would constitute the termination point for the entrance opening. This entrance opening can be formed by simply cutting away the desired portion of layer 30 so that the entire layer, even when it includes cross piece 64, could be a one piece structure formed from a single piece of foam insulation.

Layer 32, the third foam insulating layer, includes an exit opening 70 at one end aligned with exit openings 26, 40 and 48, respectively, and a slot-type opening 72 provided in the opposite end. As will be noted from FIG. 1, this layer does not include an entrance opening. That is to assure that when its bottom surface engages the top surface of layer 30, air entering openings 24, 38 and 46, will be deflected into the enlarged opening and pass through a cavity defined by the top surface of layer 28, the bottom surface of this third layer 32 and by edges 50, 52, 54, 56, and member 64 when included. Air exits from that cavity by passing upwardly through a slot 72 located at the opposite end from exit opening 70. As shown, slot 72 extends substantially across the entire width of third layer 32. Preferably, slot 72 is at least as wide as the distance between edges 54 and 56 which define the outer margins of the cavity through which the entrance air will pass between the first, second and third layers and accordingly, the slot 72 should be as large as that dimension.

Layer 34, the wire mesh, is comprised of four double layers which are folded one over another to produce an eight layer thick batting. The wire is preferably blackened or colored a dark color to aid in absorbing solar energy and provides a filling for the space between the top surface of third layer 32 and transparent sheet 36 through which air can pass and be heated.

As shown by the arrows in FIG. 1, air will enter the entrance opening 24 in the outer housing 12 and pass through entrance openings 38 and 46 in the first and second insulation layers. It then flows down through the cavity defined between the first and third layers and edges 50, 52, 54 and 56 in the second layer and will then pass through slot 72. Thereafter it will flow through the batting or matrix of the wire mesh and then out through exit openings 72, 48, 40 and 26, respectively, in the various layers, and finally into the area being heated.

Connected about the entrance and exit openings 24 and 26 on bottom wall 14 is an exteriorly mounting assembly, generally indicated at 80, which includes a top wall 82, side walls 84 and 86, front walls 88 and 90 and bottom wall 92. A mounting collar is connected to side walls 84 and 86, top wall 82 and bottom wall 92. The mounting assembly 80 is held to the collector structure by means of bolts or screws 96 and a baffle plate 98 is secured to the top, front and bottom walls about half way between side walls 84 and 86 in order to define separate entrance and exit chambers. A duct 100 leads into the entrance chamber which surrounds entrance opening 24 whereas a discharge or exit duct 102 leads away from the exit chamber located between baffle 98 and side wall 86 adjacent exit opening 26. Exit duct 102, as shown in FIGS. 3 and 4, includes a fan assembly, generally indicated at 104, which includes mounting brackets 106 for securing the fan motor 108 within duct 102 which in turn drives the fan 110.

When using a wire matrix structure formed from sleeve type batting comprised of double layers of wire mesh before being doubled, an eight layer bat can be prepared by folding four layers from that sleeve-type batting. I have found it is preferable to use 0.01 gauge aluminum or copper wire, with each sleeve or batting portion being about 43 inches wide. This allows production of a collector structure having outer dimensions of approximately 76 inches by 46 inches by 5.5 inches which when faced south on a typical day can produce temperature of about 300 degrees Fahrenheit or enough to heat a 400 square foot room. It should also be understood that several of these units can be combined together in series or in parallel with a common collection duct intersecting exit ducts 102 and with a separate single larger fan assembly or by still using the individual fan assemblies in each duct 102 as is shown herein. Such an arrangement would allow a larger area to be heated to a comfortable degree by this apparatus. In addition, it should be understood as well that if desired, filtering material of some highly porous type could be used either in the entrance or exit chambers of the mounting assembly 80 in order to help filter air being circulated through the collector structure.

While the invention has been described in connection with what is presently considered to be the most practical and preferred embodiment, it is to be understood that the invention is not be limited to the disclosed embodiment but on the contrary, is intended to cover various modifications and equivalent arrangements included within the spirit and scope of the appended claims, which scope is to be accorded the broadest interpretation so as to encompass all such modifications and equivalent structures.

What I claim is:

1. A solar collector for directly heating the air going to a building comprised of frame means including side and bottom walls for enclosing the collector along those wall areas, said bottom wall including means defining two spaced apart openings adjacent one end for allowing air to respectively enter and exit the collector, a first insulation layer engaging the interior of said bottom wall and provided with means defining two spaced apart openings in alignment with each of the openings in the bottom wall, a second insulation layer positioned on said first insulation layer having means defining two spaced apart openings at one end in alignment with each of the openings in said first insulation layer, one of said openings aligned with the entrance opening being enlarged to form a gradually enlarging area extending along the length and width of said second insulation layer so that the opening extends to and substantially across the width of the opposite end thereof, a third insulating layer covering said second insulating layer and having first means at one end defining an opening aligned with the exit opening and second means at the opposite end defining a slit type opening extending substantially across the width of said opposite end, a permeable adsorber layer positioned above said third insulation layer, a transparent cover layer extending across said collector and sealed to said side walls, and mounting means positioned about the exterior of the entrance and exit openings for connecting said collector directly to the atmosphere in the building, said mounting means including air circulation means for circulating air from the building through the collector and back to the building.

2. A solar collector for heating a building comprised of an outer housing having rear and side walls, said rear wall including spaced apart air entrance and exit openings adjacent one end, first, second and third insulating layers located within said housing, said first and second layers each having entrance and exit openings aligned with those in said rear wall, said second layer further including means for defining a channel therein leading from the entrance opening toward the other end thereof, said channel means expanding along its length so that it extends substantially across the width of said other end, said third layer including an exit opening at one end thereof aligned with the exit opening in said rear wall and an elongated opening at the opposite aligned with the termination of the opening at said other end of said second layer, a porous collector positioned above said third layer, transparent cover means for closing said housing and mounting means positioned about said entrance and exit for connecting said collector to the atmosphere in the building and circulating at least a portion of that atmosphere therethrough.

3. A solar space heater comprised of an outer housing having rear and side members and a transparent front member, at least first, second and third layers of insulation mounted in contact with one another within said outer housing between said front and rear members so that said first, second and third layers are spaced from said front member thereby defining a chamber therebetween, said second layer being positioned between said first and third layers and having a predetermined portion cut away to define an internal duct extending therebetween extending from one end to the other of said second layer, means defining an inlet and outlet for said heater, said inlet means leading to said internal duct, said outlet leading to said chamber, said third layer defining one side of said chamber and having means defining an opening at one end in communication with said outlet means and another opening at the end opposite said one end in communication with said internal duct and a plurality of layers of blackened mesh material positioned within said chamber.

* * * * *